March 14, 1961 G. K. HAUSE 2,974,768
VARIABLE SPEED FAN DRIVES
Filed Oct. 15, 1958
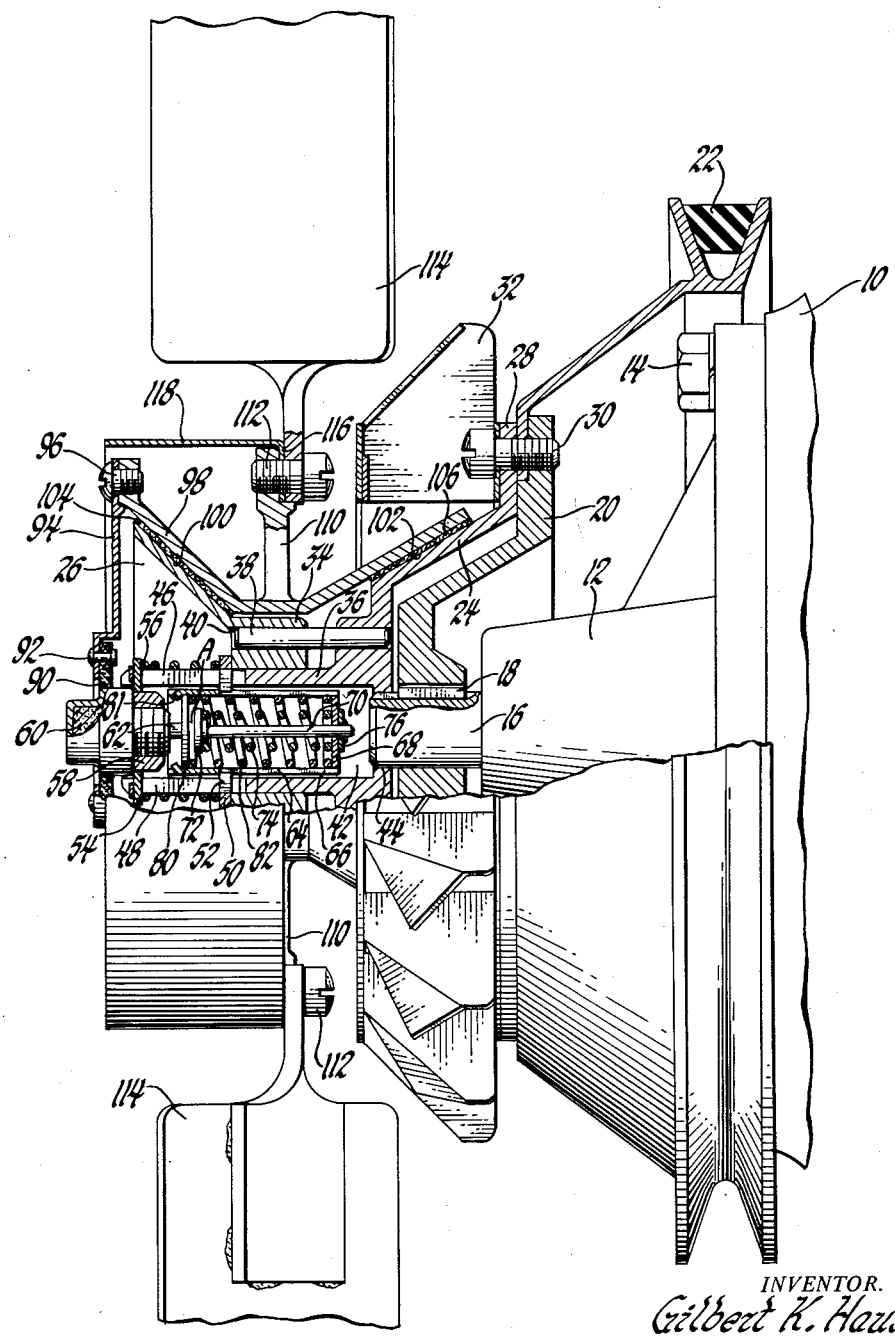
INVENTOR.
Gilbert K. Hause
BY
George E. Johnson
ATTORNEY United States Patent Office 2,974,768
Patented Mar. 14, 1961

2,974,768

VARIABLE SPEED FAN DRIVES

Gilbert K. Hause, Bloomfield Hills, Mich., assignor to General Motors Corporation, Detroit, Mich., a corporation of Delaware Filed Oct. 15, 1958, Ser. No. 767,474

13 Claims. (Cl. 192—82)

This invention relates to fan drives and more particularly to drives attachable to engine shafts for actuating cooling fans in accordance with air or engine temperatures.

It is well known that fans for cooling vehicle engines are commonly driven regardless of their need; i.e., the fans are operated when the engines are cold and when the ambient temperatures are low. This waste of power and wear is tolerated in the interest of always having the fans available when they are needed and also because simplicity and low cost are desirable characteristics of any mechanism.

An object of the present invention is to provide an improved fan drive which will operate in accordance with service demands and which is simple in structure and also low in cost.

A feature of the present invention is a fan drive comprising surfaces held in frictional engagement by a thermostatic motor to vary the speed of a fan dependent upon temperature conditions. Another feature is a fan drive including diverging friction cones serving as a bearing or support for a fan. Another feature comprises multiple coaxial springs arranged in a fan drive assembly whereby a thermostatic motor may increase or decrease the loading of the springs in series to vary frictional engagement pressure and, hence, the driven speed of a fan.

The above and other important features of the invention will now be described in detail in the specification and then pointed out more particularly in the appended claims.

The single figure of the drawing depicts one embodiment of the present invention in the form of a fan drive as mounted on the front end of a vehicle engine depicted at 10. The outside casing of a conventional engine coolant pump is shown at 12 and this is fixed to the engine block by means of bolts such as the bolt 14. A coolant pump shaft 16 extends forwardly from the pump 12 and is keyed as at 18 to a two-piece pulley 20. The latter is adapted to be driven by a V-belt 22.

The fan drive comprises two diverging driving cones 24 and 26. The driving cone 24 bears an annular flange 28 which is held to the pulley 20 by means of screws such as the screw 30. These screws also serve to retain a secondary fan 32 in position around the driving cone 24 and spaced therefrom for a purpose to be described hereinafter. The secondary fan 32 includes multiple blades, the forms of which may be varied considerably.

The driving cone 26 is provided with a hub 34 and this hub is rotatable with a hollow hub 36 which is integral with the driving cone 24. A pin 38 has one end fixed to the cone 24 and its other end slidable in a bore 40 formed in the hub 34. There are three of these pins 38 equally spaced around the axis of the hub 36 although only one pin is shown in the drawing.

The hub 36, being hollow, defines a cavity 42 and also a bore 44 into which the end of the pump shaft 16 fits.

The hollow hub 36 bears diametrically opposed slots 46 and 48 and a ring 50 is slidable along the hub with two lugs or projections 52 extending therefrom through the slots 46 and 48 and into the cavity 42. A ring 54 is fixed to the open end of the hollow hub 36 and this ring is of larger diameter than the hub in order to serve as a stop for one end of a coil spring 56 which surrounds the hub. The other end of the spring 56 abuts the ring 50 which in turn abuts one end of the cone hub 34. The inner diameter of the ring 54 is such as to accommodate a reduced portion 58 of a wax type pellet motor 60 which is adapted to rotate with the hub 36. A thermostatic pellet type motor of similar construction is disclosed in the United States Patent 2,815,916, granted December 10, 1957, in the names of J. R. Holmes, H. A. Reynolds and A. Schwarz. Such a motor includes a substance which expands upon change of state when subjected to an increase in temperature, the effect being to project a plunger 62 from the body of the motor with considerable force. When the ambient temperature decreases, the plunger 62 may easily be pushed back into the main body of the motor. A spring retaining cylinder 64 is located in the cavity 42 and diametrically opposite sides of this cylinder are slotted as at 66 to receive the ends of the lugs 52. The slots 66 extend only a portion of the length of the cylinder 64 so that the latter presents shoulders at the ends of the slots for abutting the lugs 52. One end of the cylinder 64 is closed by a disc 68 which is apertured centrally to receive a rod 70. The latter bears a head or disc 72 at one end for retaining a coil spring 74 against the disc 68. A washer 76 is fastened rigidly to the other end of the rod 70 so that the latter limits endwise expansion or the minimum loading of the coil spring 74. The open end of the cylinder 64 is provided with a slidable disc 80 against which the plunger 62 is adapted to act. Inturned tabs 81 on the cylinder retain the disc 80 therein. A coil spring 82 is confined between the discs 80 and 68 and surrounds the spring 74. It will be understood that the tabs 81 and the disc 80 determine the minimum loading of the spring 82.

A fibrous washed 90 slidably and rotatably engages the outer periphery of the pellet motor 60 and is fixed by means of rivets 92 to a circular plate 94. The periphery of the latter is attached by means of screws, such as the screw 96, to the periphery of a driven annular fan support 98. The latter has two conical surfaces 100 and 102 to cooperate with the two driving cones 24 and 26. A frictional lining 104 is interposed between the cone 26 and the opposing surface of the driven support 98. Similar lining 106 is provided between the cone 24 and the rearward annular or conical portion of the support 98. The friction linings 104 and 106 may be attached to either of the surfaces between which they are interposed. Preferably they are cemented to the driven cones 24 and 26. Intermediate the axial length of the driven support 98 are radial arms which may be six or eight in number. Such arms are depicted at 110. These arms are spaced about the driven member 98 to provide air flow passages between them and they are also attached by screws 112 to a circular ring of a multiple bladed fan 114 as well as to the inwardly directed flange 116 of a cylindrical air scoop 118. The latter extends forwardly and surrounds the forward portion of the support 98 as well as the circular plate 94. It will be noted that the air scoop 118 is of such diameter that it affords an air passageway through it and by the perimeter of the plate 94 and the support 98.

Particular attention should be directed to the small space indicated at A between the discs 72 and 80. This space insures a preferred application of the spring loading in a series of steps as will further appear.

Under conditions of low engine temperature or low ambient air temperature, the plunger 62 of the motor 60 will be in its withdrawn position as depicted in the drawing. At this time the coil spring 56 will exert a light pressure against the ring 50 and this in turn will cause the driving cones 24 and 26 to be effective in applying through friction a light torque in rotating the fan 114. If the engine speed increases without an increase in the air or engine temperatures, the frictional contact will be such that there will be considerable slippage and the fan 114 will rotate slowly and be of practical non-effect. As the ambient temperature or the engine temperature increases, the motor 60 will be caused to project the plunger 62 and place the spring 82 under additional loading. As a consequence, the cylinder 64 will act through the lugs 52 and the ring 50 to move the cone 26 to the right as viewed in the drawing. The movement is slight but such as to increase the effective frictional engagement of the driving cones with the driven support member 98. Because of the increased pressure, the slippage will decrease and the fan 114 will rotate more rapidly to compensate for the higher temperatures referred to.

With a further increase in the temperatures concerned, the plunger 62 will further compress the spring 82 with accompanying slippage reduction and ultimately eliminate the space A so that the discs 80 and 72 will come into contact. Loading will now be applied to the inner spring 74 with the result that pressure on the linings 100 and 102 will increase still further with a consequent further decrease in slippage and a further increase in the fan rotational speed. Minimum slippage or maximum fan speed at any particular engine speed is had when the three springs 56, 82 and 74 act with the force of their accumulated loadings.

If the engine or ambient air temperatures decrease, the springs 74 and 82 will, in turn, be relieved of their loading until the light loading of the spring 56 is again solely relied upon to affect frictional pressure on the linings. Although this pressure is light, it is adequate to retain the support 98 properly in position, for the cones 24 and 26 serve as bearing members and endwise movement of the fan 114 is prevented by the diverging conical configuration of the frictionally engaging surfaces. It will be noted that the angles of the driving cones 24 and 26 with respect to their axes are different. This is to compensate for the thrust of the fan 114 and makes the pressure on the areas of the linings 104 and 106 more uniform.

It is preferred that the secondary fan 32 be utilized for under extreme or heavy load conditions it may be necessary to dissipate heat generated by friction in the variable drive. Slippage with respect to the linings 100 and 102 under high temperature conditions may present difficulties if it occurs frequently or for an undue length of time, but these difficulties are avoided with the use of the secondary fan 32 for air will be drawn rearwardly and toward the engine 10 in a path extending along the exterior surfaces of the driven support 98. The cooling air will enter the scoop 118, pass between the arms 110 and rearwardly by way of the blades in the secondary fan 32.

I claim:

1. A fan drive comprising a pair of diverging driving cones, one of said cones being fixed against axial motion and including a hollow hub, the other of said cones being axially slidable on said hub, means arranged to hold said cones in non-rotative relation with respect to each other, a thermostatic motor fixed to said hub and having a power actuated member, means for transmitting force from said power actuated member to said axially movable drive cone including multiple springs, said power actuated member being effective initially to apply force to one only of said multiple springs and subsequently to apply force to all of said multiple springs, and a driven annular fan support having a pair of diverging conical surfaces engaging said drive cones.

2. A fan drive comprising a pair of diverging driving cones, one of said cones being fixed against axial motion and including a hollow hub, the other of said cones being axially slidable on said hub, means arranged to hold said cones in coaxial and non-rotative relation with respect to each other, a thermostatic motor fixed to said hub and having a power actuated member, a driven annular fan support having diverging conical surfaces engaging said driving cones, said pair of driving cones and the conical surfaces of said driven fan support cooperating to provide a floating support for said fan, means for applying a continuously effective force to said axially movable drive cone to engage said drive cones to said driven conical surfaces in continuously slipping engagement, means for transmitting force from said power actuated member to said axially movable cone through a plurality of force transmitting paths, said power actuated member being initially effective to apply force to said axially movable drive cone through one only of said power transmitting paths, and subsequently effective to apply force to said axially movable cone simultaneously through all of said torque transmitting paths.

3. A fan drive comprising a pair of diverging driving cones, one of said cones being fixed against axial motion, a hollow hub integral with said one cone, the other of said cones having a hub axially slidable on said hollow hub, means arranged to hold said cones in non-rotative relation with respect to each other, a pellet type thermostatically operated motor fixed to said hollow hub and having a power actuated plunger, a driven annular fan support having diverging conical surfaces engaging said driving cones, said driving cones and the conical surfaces of said driven fan support cooperating to provide a floating support for said fan, means for applying a continuously effective force to said axially movable drive cone to engage said drive cones to said driven conical surfaces in continuous slipping engagement, and means for transmitting force from said power actuated member to said axially movable drive cone including a plurality of springs, said power actuated member being initially effective to apply force to less than the total number of said springs and subsequently to apply force to all of said springs simultaneously.

4. A fan drive comprising a pair of driving cones, one of said cones being fixed against axial motion, a hollow hub joined to said one cone to rotate therewith, the other of said cones being axially slidable on said hollow hub, means arranged to transmit the rotation of said one cone to the other, a thermostatic motor fixed to one end of said hollow hub and having a power actuated plunger, a driven annular fan support having diverging conical surfaces engaging said driving cones, said pair of driving cones and the conical surfaces of said driven fan support cooperating to provide a floating support for said fan, means for applying loading to said axially slidable drive hub for engaging said drive cones and driven cone surfaces in continuously slipping engagement comprising a first spring, means for transmitting force from said plunger to said axially slidable drive cone including a pair of springs, said plunger being initially effective to apply force to one only of said springs and subsequently effective to apply force simultaneously to both of said pair of springs.

5. A fan drive assembly comprising in combination, a power input assembly including a pair of spaced engine driven power input cone members, one of said cone members being axially movable with respect to the other of said cone members, a fan hub having a pair of spaced cone members thereon, said spaced power input cone members and said spaced fan hub cone members cooperating to provide a floating support for said fan hub, spring means for biasing said axially movable power input cone member into relatively light contact engagement with one of said fan hub cone members to provide slipping engagement of said pair of power input cone members and said fan hub cone members, a thermostatic motor adapted to expand and contract with temperature variation, and means for transmitting force from said motor to said axially movable drive cone member to vary the frictional engagement of power input cone members with said fan hub cone members in response to temperature variation.

6. A fan drive assembly comprising in combination, a power input unit including a pair of spaced power input drive cones, one of said drive cones being axially movable with respect to the other of said drive cones, a fan hub having a central web portion and a pair of spaced cone members, said power input drive cones and said fan hub cone members cooperating to provide a floating support for said fan hub, an annular air scoop carried by said central web and overlying one of said drive cones and one of said fan hub cones, an auxiliary fan driven by said power input member and adapted to draw cooling air through said air scoop to cool said drive cones and said fan hub cones, spring means for biasing said axially movable power input drive cone into relatively light contact engagement with one of said fan hub cone members to provide slipping engagement of said power input cone members and said fan hub cone members, a thermostatic motor adapted to expand and contract with temperature variation, and means for transmitting force from said motor to said axially movable cone to vary the frictional engagement of said power input cone members with said fan hub cone members in response to temperature variation.

7. A fan drive assembly comprising in combination, a pair of spaced engine driven power input cone members, one of said cone members being supported upon and axially movable with respect to the other of said cone members, a fan hub having a pair of spaced cone members thereon, said spaced power input cone members and said spaced fan hub cone members cooperating to provide a floating support for said fan hub, a first spring normally biasing said axially movable power input cone member into engagement with one of said fan hub cone members to provide slipping engagement of said power input cone members and said fan hub cone members, a thermostatic motor supported upon one of said power input cone members and adapted to expand and contract with temperature variation, and means for transmitting force from said motor to said axially movable cone member to vary the frictional engagement of said power input cone members with said fan hub cone members including a spring carried by said power input cone member which supports said motor.

8. A fan drive assembly including a pair of spaced drive cones, one of said drive cones being fixed against axial motion and having a hollow base, the other of said drive cones being supported on said base for axial motion with respect to said first-mentioned drive cone, means connecting said second-mentioned drive cone to said first-mentioned drive cone for rotation therewith as a unit, a fan hub comprising a fan support member and having diverging cone members extending outwardly at opposite sides of said fan support member, said pair of drive cones and said fan hub cones cooperating to provide a floating support for said fan hub, means effective to yieldably bias said axially movable drive cone into slipping contact with one of the cones on said fan hub, a temperature responsive power actuator supported upon said hollow base, and adapted to expand and contract with temperature variation, and means for transmitting an axial thrust from said power actuator to said axially movable drive cone including a spring disposed within said hollow base.

9. A fan drive assembly including a pair of spaced drive cones, one of said drive cones being fixed against axial motion and having a hollow base, the other of said drive cones being supported upon said base for axial motion with respect to said first-mentioned drive cone, means connecting said second-mentioned drive cone to said first-mentioned drive cone for rotation therewith as a unit, a fan hub comprising a fan support member and having diverging cone members extending outwardly at opposite sides of said support member, said pair of drive cones and said fan hub cones cooperating to provide a floating support for said fan hub, means effective to bias said axially movable drive cone into slipping contact with one of the cones on said fan hub, a temperature responsive power actuator fixed to said hollow base, means for transmitting force from said power actuator to said axially movable drive cone including a spring disposed within said hollow base, an annular air scoop extending around one of said drive cones and one of said fan hub cones, and an auxiliary fan carried by the other of said drive cones for drawing cooling air through said air scoop to cool said cones.

10. A fan drive assembly including a pair of spaced drive cones, one of said drive cones being fixed against axial motion and having a hollow base, the other of said drive cones being supported upon said base for axial motion with respect to said first-mentioned drive cone, means connecting said first-mentioned drive cone to said second-mentioned drive cone for rotation therewith as a unit, a fan hub comprising a fan support member and having diverging cone members extending outwardly therefrom, said pair of drive cones and said fan hub cones cooperating to provide a floating support for said fan hub, a first spring carried upon said hollow base and effective to bias said axially movable drive cone into slipping contact engagement with one of the cones on said fan hub, a temperature responsive power actuator supported upon said hollow base and adapted to expand and contract with temperature changes, first means for transmitting force from said actuator to said axially movable drive cone including a spring disposed within said hollow base, and second means for transmitting force from said actuator to said axially movable drive cone including an additional spring disposed within said hollow base.

11. A fan drive assembly including a pair of spaced drive cones, one of said drive cones being fixed against axial motion and having a hollow base, the other of said drive cones being supported upon said base for axial motion with respect to said first-mentioned drive cone, means connecting said first-mentioned drive cone to said second-mentioned drive cone for rotation therewith as a unit, a fan hub comprising a fan support member and having diverging cone members extending outwardly therefrom, said pair of drive cones and said fan hub cones cooperating to provide a floating support for said fan hub, a first spring carried upon said hollow base and effective to bias said axially movable drive cone into slipping contact engagement with one of the cones on said fan hub, a temperature responsive power actuator supported upon said hollow base and adapted to expand and contract with temperature changes, first means for transmitting force from said actuator to said axially movable drive cone including a spring disposed within said hollow base, and second means for transmitting force from said actuator to said axially movable drive cone including an additional spring disposed within said hollow base, said power actuator being effective upon a rise in temperature to partially compress one of the springs within said hollow base before transmitting any force to said additional spring.

12. A fan drive assembly including a pair of spaced drive cones, one of said drive cones being fixed against axial motion and having a hollow base, the other of said drive cones being supported upon said base for axial motion with respect to said first-mentioned drive cone, said hollow base having a chamber therein, means connecting said second-mentioned drive cone to said first-mentioned drive cone for rotation therewith, a fan hub comprising a fan support member and having diverging cone members extending outwardly therefrom at opposite sides of said fan support member, said pair of drive cones and said fan hub cones cooperating to provide a floating support for said fan hub, a series of axially extending slots in said hollow base, a ring member carried by said hollow base and having a series of lugs extending through said slots, a spring supported upon said hollow base and contacting said ring, said ring being axially movable on said hollow base and contacting the hub of said axially movable drive cone, said spring being effective to bias said ring to position said axially movable drive cone into slipping contact engagement with one of the cones on said fan hub, a temperature responsive power actuator supported upon said hollow base and having a plunger extending into said hollow base, an axially movable cylinder disposed in said hollow base and having a plurality of slots therein adapted to receive the lugs on said ring, a first spring disposed in said cylinder for transmitting force from said power actuator to said cylinder, a second spring disposed in said cylinder adapted to transmit force from said power actuator to said cylinder, said cylinder being movable in response to force applied thereto to transmit force to said axially movable drive cone through said ring.

13. A fan drive assembly including a pair of spaced drive cones, one of said drive cones being fixed against axial motion and having a hollow base, the other of said drive cones being supported upon said base for axial motion with respect to said first-mentioned drive cone, said hollow base having a chamber therein, means connecting said second-mentioned drive cone to said first-mentioned drive cone for rotation therewith, a fan hub comprising a fan support member and having diverging cone members extending outwardly therefrom at opposite sides of said fan support member, said pair of drive cones and said fan hub cones cooperating to provide a floating support for said fan hub, a series of axially extending slots in said hollow base, a ring member carried by said hollow base and having a series of lugs extending through said slots, a spring supported upon said hollow base and contacting said ring, said ring being axially movable on said hollow base and contacting the hub of said axially movable drive cone, said spring being effective to bias said ring to position said axially movable drive cone into slipping contact engagement with one of the cones on said fan hub, a temperature responsive power actuator supported upon said hollow base and having a plunger extending into said hollow base, an axially movable cylinder disposed in said hollow base and having a plurality of slots therein adapted to receive the lugs on said ring, first force transmitting means for transmitting force from said plunger to cylinder, second force transmitting means for transmitting force from said cylinder, said cylinder being effective to transmit force applied thereto to said axially movable drive cone through said ring, said plunger being initially effective to transmit force to said cylinder solely through said first force transmitting means and thereafter effective to apply force to said cylinder simultaneously through both said first and second force transmitting means.

References Cited in the file of this patent
UNITED STATES PATENTS

| 2,637,308 | Dodge | May 5, 1953 |
| 2,815,916 | Holmes et al. | Dec. 10, 1957 |
| 2,840,316 | Herbenar | June 24, 1958 |